FREQUENCY SHIFT KEYED SIGNAL CONVERTER

Filed Nov. 18, 1957 2 Sheets-Sheet 1

INVENTORS
LEWIS S. BILLIG
JAMES K. WATSON
KENNETH C. PERKINS
BY Walter J. Kreske
ATTORNEY Nov. 28, 1961 L. S. BILLIG ET AL 3,011,023

FREQUENCY SHIFT KEYED SIGNAL CONVERTER

Filed Nov. 18, 1957 2 Sheets-Sheet 2

INVENTORS
LEWIS S. BILLIG
JAMES K. WATSON
KENNETH C. PERKINS

BY Walter J. Kreske
ATTORNEY

United States Patent Office 3,011,023
Patented Nov. 28, 1961

3,011,023
FREQUENCY SHIFT KEYED SIGNAL CONVERTER

Lewis S. Billig, Wayland, and Kenneth C. Perkins, Lynnfield Centre, Mass., and James K. Watson, Concord, Calif., assignors to General Electronics Laboratories, Inc., Cambridge, Mass., a corporation of Massachusetts
Filed Nov. 18, 1957, Ser. No. 698,886
10 Claims. (Cl. 178—88)

This invention relates to frequency shift keyed signal converters and more particularly to frequency shift keyed signal converters having improved characteristics under interference signal conditions, and particularly adaptable for use in radio teletypewriter systems.

In the transmission of information such as by teletypewriter, the letters are coded into series of voltage bits. The bits are binary in character and can be considered as either a "space" or a "mark" signal. A customary manner for the radio transmission of this coded information is by frequency modulation of a carrier signal. The use in teletypewriter systems of one carrier frequency to designate a "space" and another carrier frequency to designate a "mark" is referred to as "frequency shift keying." In this system a carrier is automatically shifted in frequency a fixed amount to correspond to change from space coding to mark coding. At the receiving end of such radio teletypewriter system, the terminal apparatus must include a converter used with an associated radio receiver for changing the output signals of the receiver back to direct current teletypewriter pulses or bits for use in the terminal teletypewriter. These direct current pulses carry the information for operating the proper keys of the teletypewriter. This information is in code, as explained above in connection with its transmission, with the pulses herein being termed "marks" and the intervals between the marks being termed "spaces."

A primary problem in these systems is that interfering radio signals near the "mark" or "space" frequency, if of sufficient strength, cause the system to lock out and cease to function and thereby fail to record the desired information. Pursuant to the present invention, this problem has been overcome in a converter which also incorporates other desirable features and advantages. Among these other desirable features and advantages are a conveter which utilizes an inherent characteristic of frequency shift keyed transmission for overcoming the undesirable effects of interference signals. Another of these features, is that of achieving a system which has substantially the effect of increasing the number of channels carrying the desired information with each channel operating at a different carrier frequency.

The present invention is based on a recognition and an advantageous use of an inherent property of frequency shift keyed type signals which is that all of the information in the total signal is carried in both the "mark" and the "space" channels. For example, if the total coded information signal consists of space, mark, space, space, the space channel only sees on, off, on, on, while conversely the "mark" channel only sees off on, off, off. Thus, each of these channels carry the total information. In accordance with the present invention this information is conveyed to the teletypewriter even through interfering signals make the information signals in one of the channels unintelligible.

Accordingly, a primary object of the present invention is the provision of a converter for frequency shift keyed information which minimizes the effect of interfering signals on the reception of the desired information.

Another object is the provision of a converter for frequency shift keyed information which minimizes the effect of interfering signals upon the operation of the terminal teletypewriter.

A further object is the provision of a converter for frequency shift keyed information which uses two channels, one for the "mark" and one for the "space" information signals together with a provision for either of the channels singly or both channels combined to convey the signal information.

Another object is the provision of a converter for frequency shift keyed information having two channels one for "mark" frequency information signals and the other for "space" frequency information signals with provisions for selection of the channel carrying the lesser amount of interference signals to convey the desired information.

These objects, features and advantages are achieved generally by providing one channel for selectively receiving mark frequency information signals, another channel selectively receiving space frequency information signals, a signal comparing arrangement coupled to the channels for selecting the channel carrying the clearest information signals, and a switching circuit coupled to both channels and in a responsive relation to the channel selecting arrangement for passing the signals of the selected channel.

By providing separate amplitude and signal detector circuits for each channel a longer time response constant to signal changes may be allowed in the amplitude detector circuit for achieving a reliable interference signal measuring arrangement.

By providing a comparing arrangement for the amplitude detector circuits in the "mark" and "space" channels and a switching circuit in responsive relation to the comparing arrangement, a structure for identifying the channel carrying the smallest amount of interference is thereby achieved.

By connecting the amplitude detectors at the input of signal amplitude limiters and the signal detectors at the output of the signal amplitude limiters, wide amplitude differential is thereby made available to the amplitude detectors to achieve greater sensitivity to average changes in amplitude as well as uniformity of signal output from the signal detectors for proper balancing action in the apparatus.

By providing automatic gain control in the receiver preceding the converter and the amplification stages at the input of the converter, capture effect of the equipment is thereby minimized. Capture effect as herein used refers to the tendency for the stronger of two input signals to dominate or further depress the weaker signal. Capture effect is described and explained in an application entitled "Anti-Capture Signal Receiving Apparatus," Serial No. 694,694, filed on October 29, 1957, in the United States Patent Office.

By providing a cathode follower at the second stage of amplification, prevention of loading of the second amplification stage by the automatic gain control detector is thereby achieved to minimize distortion of the output wave form.

By providing a double pole switching arrangement for signal output from the converter, a reference circuit corresponding to the channel output of the "mark" and "space" signals, a relay for selectively coupling one pole to the "mark" channel or the corresponding reference circuit, a relay for selectively coupling the other pole to the "space" channel or the corresponding reference circuit, and a comparing arrangement coupled to both channel amplitude sensing circuits and relays for controlling the selective operation of the relays, a suitable arrangement for utilizing the information from the channel carrying the least interfering signals is thereby achieved.

These and other features, objects and advantages of the invention will become more apparent from the following description taken in connection with the accompanying drawings, and wherein.

Figure 1:
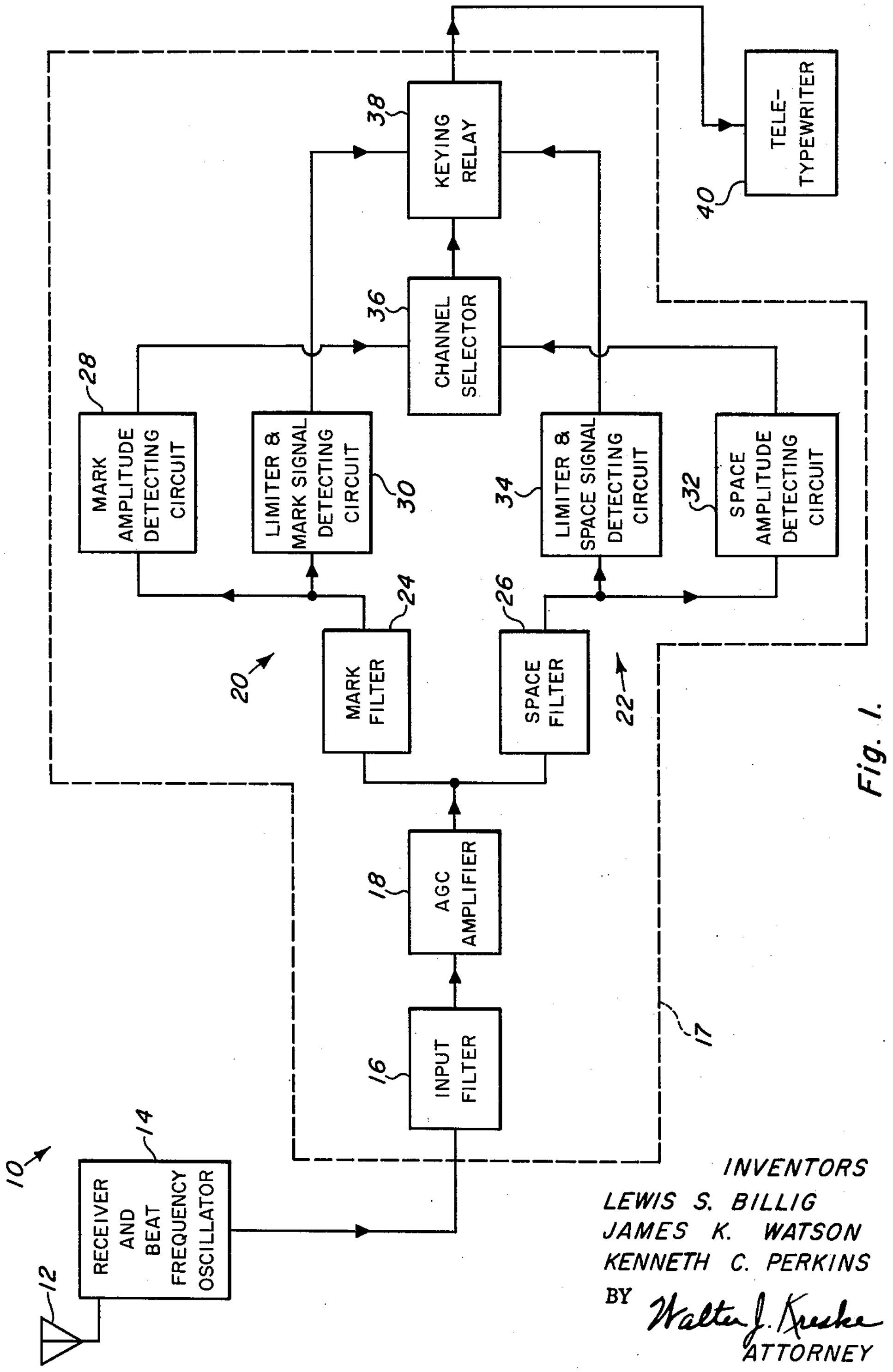
FIG. 1 is a block diagram of a frequency shift keyed radio teletypewriter receiving system made in accordance with the present invention.

Referring to FIG. 1 in more detail, a frequency shift keyed radio teletypewriter receiving system made in accordance with the present invention, is designated generally by the numeral 10. The receiving system 10 has a conventional antenna 12 for picking up the two carrier frequency signals for "space" and "mark" coded information as herein above described. The antenna 12 feeds a conventional communications receiver 14 having a beat frequency oscillator. The output of the beat frquency oscillator beats with the output of the intermediate frequency amplifier of the receiver 14 to produce a signal which is frequency shifted about an audio frequency center in conventional manner. This output of the receiver and beat frequency oscillator 14 is fed to an input filter 16 in a frequency shift keyed converter 17. The receiver 14 is preferably of the type using automatic gain control in place of limiters with anti-capture characteristics such as described in the above-mentioned application for patent entitled "Anti-Capture Signal Receiving Apparatus."

By way of example only and not intended for limitation, the beat frequency oscillator in the receiver 14 may be set for a frequency value such that the output of the receiver 14, carrying the useful mark and space code information, may be at 2125 cycles per second for the mark and 2975 cycles per second for the space information output. This is a frequency differential of 850 cycles per second between mark and space coded information carrier signals. To isolate this mark and space frequency information the input filter 16 should have a narrow pass-band with sharp signal frequency cutoff characteristics on either side of a desirable flat center signal range. The pass-band of the input filter 16, will depend upon the stability of oscillators in the receiver 14. A pass-band of 1600 to 3600 cycles per second was found suitable for the present exemplary embodiment using 2125 and 2975 cycles per second for the mark and space signals respectively.

The output of the filter 16 is fed to an automatic gain control amplifier circuit 18 for suitable amplification to a desired level. Automatic gain control was preferably used in the amplifier 18 as distinguished from the use of limiters to avoid signal capture effect characteristic of limiter type equipment.

The output of the amplifier 18, is then fed to a pair of channels 20 and 22 for mark and space information signals respectively. The input to the mark channel 20 has a mark information signal filter 24 having a desirably narrow pass-band which in the exemplary embodiment is centered on the 2125 cycles per second frequency mark signal. Similarly, the space channel 22, has a filter 26, with a narrow pass-band centered on the exemplary 2975 cycles per second "space" signal frequency.

The output of the mark information filter 24, in the "mark" channel 20, is fed to two circuits 28 and 30, namely a mark amplitude detecting circuit and a signal limiter and mark signal detecting circuits respectively. The mark amplitude detecting circuit 28 has a function of sensing overall amplitude signal level due to both the mark information signals and interfering signals from the output of the mark filter 24. An exemplary circuit suitable for use as the mark amplitude detecting circuit 28 is hereinafter described in connection with FIG. 2. The mark signal detecting and limiter circuit 30 is for detecting the desired mark information signals from the output of the mark filter 24 and maintaining them at a level for balancing equipment operation as will be hereinafter further described.

In like manner, the output of the space filter 26 in the space information channel 22 is fed to a space amplitude detecting circuit 32 and a limiter and space signal detecting circuit 34. The circuits 32 and 34 are similar in construction and similar in function to the circuits 28 and 30 hereinabove described except in that the circuits 32 and 34 are for space information signals in the space information channel 22 as distinguished from the mark information signals.

The time response characteristic of the mark amplitude detecting circuit 28 and the space amplitude detecting circuit 32 will be substantially the same and much slower in response than that of the limiter and mark signal detecting circuit 30 and the limiter and space signal detecting circuit 34. The output of the mark amplitude detecting circuit 28 and the space amplitude circuit 32 are fed to a channel selector or switching circuit 36 which is connected to a keying relay circuit 38. The output of the limiter and mark signal detecting circuit 30 and the output of the limiter and space signal detecting circuit 34 are both fed to the keying relay circuit 38 for operation as will be hereinafter further described. The keying relay circuit 38 is connected to a conventional frequency shift keyed teletypewriter 40, for controlling operation of the teletypewriter 40.

In the operation of the frequency shift keyed radio teletypewriter receiving system 10 the separate "mark" and "space" carrier frequency radio signals picked up by the antenna 12 are isolated in the receiver 14 which together with the beat frequency oscillator produce two audio frequency output signals corresponding to the radio carrier "mark" and "space" signals respectively. This audio output is fed to the input filter 16 for further isolation of the desired "mark" and "space" information signals. These "mark" and "space" information signals are then further amplified in the automatic gain control amplifier 18 and fed to the channels 20 and 22 for "mark" and "space" information signals respectively. In the "mark" information signal channel 20, the mark filter 24, isolates the mark frequency signals from the space frequency signals and feeds them to both the mark amplitude detecting circuit 28 and the limiter and mark signal detecting circuit 30.

In similar manner, in space information channel 22, the space filter 26 isolates the space frequency signals from the mark frequency signals and feeds the space frequency signals to the space amplitude detecting circuit 32 and the limiter and space signal detecting circuit 34.

Figure 2:
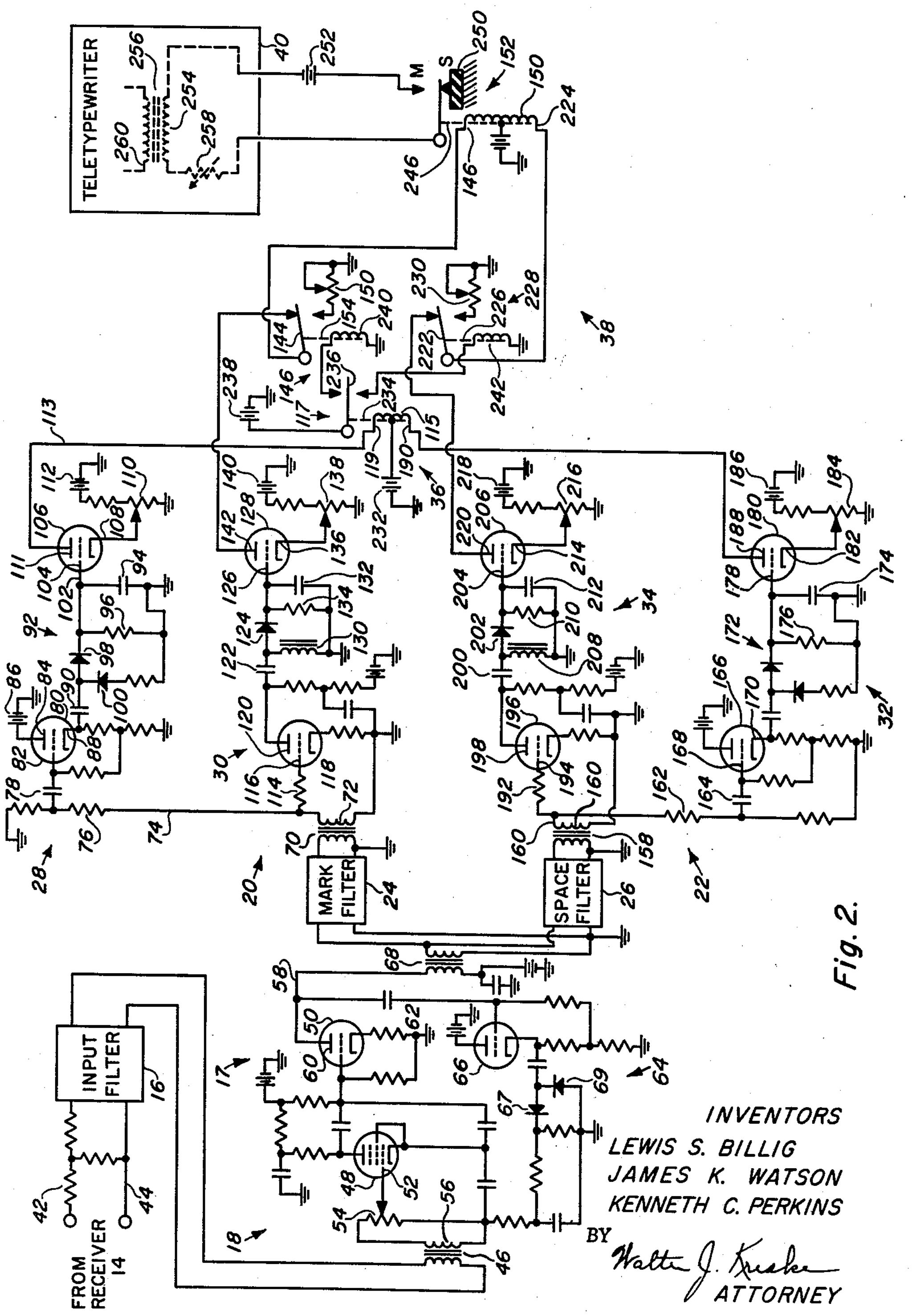
FIG. 2 is a partially schematic and a partially block diagram, illustrating circuits suitable for use in the block diagram shown in FIG. 1.

The channel selector 36, an exemplary circuit for which will be described in connection with FIG. 2, is so arranged that if the voltage level from the mark amplitude detecting circuit 28 due to interfering signals in that channel becomes greater than the voltage level from the space amplitude detecting circuit 32 because of freedom from interfering signals in the space information channel 22, the channel selector 36 will open the circuit between the keying relay 38 and the limiter and mark signal detecting circuit 30 so as to prevent information from the limiter and mark signal detecting circuit 30 from causing malfunction of the keying relay 38 and therefore the teletypewriter 40. In such instance, only the information from the limiter and space signal detecting circuit 34 will reach the keying relay 38 to effectively operate the teletypewriter 40.

In similar manner, if the voltage level in the space amplitude detecting circuit 32 becomes greater than the voltage level in the mark amplitude detecting circuit 28, the channel selector 36 will cause an open circuit between the limiter and space signal detecting circuit 34 and the relay keying circuit 38 to prevent the malfunction of the teletypewriter 40. In such instance, only the mark signal detecting circuit 30 will provide the signal information for operating the teletypewriter 40.

Referring to FIG. 2 in more detail, the frequency shift keyed signal converter 17 is shown with circuits mentioned in connection with FIG. 1 being illustrated schematically except for the input filter 16. The input filter 16 is coupled by a transformer 46 to the automatic gain control amplifier circuit 18 which has a pair of signal amplifying electron tubes 48 and 50 coupled in cascade to form, with associated circuitry two amplifier stages. The electron tube 48 has a control grid 52 coupled to a variable resistor 54 across a secondary 56 of the transformer 46 for the adjustment of input signal level to prevent overload of the input stage of the amplifier circuit 18.

An output line 58 from anode 60 of the electron tube 50 in the second stage of amplification of the amplifier 18 is connected through a capacitor 62 and a feedback network 64 to the secondary 56 of the input transformer 46 to provide simple automatic gain control for the amplifier 18. An electron tube 66 is connected into the feedback network circuit 64 as a cathode follower to prevent loading and consequent distortion of output waveform of the second stage of amplification of the amplifier 18 by automatic gain control detectors 67 or 69.

The output line 58 of the automatic gain control amplifier 18 is coupled through a transformer 68 to the mark signal frequency filter 24 and the space signal frequency filter 26 in the channels 20 and 22 respectively. The mark signal frequency filter 24 is coupled through a transformer 70 to the mark amplitude detecting circuit 28 and the limiter and mark signal detecting circuit 30. The transformer 70 has a secondary 72, one side of which is connected through a signal conducting cable or line 74, a resistor 76, and a capacitor 78 to a control grid 80 of an electron tube 82. The electron tube 82 has an anode 84 connected to the positive terminal of a power source such as a battery 86, the negative terminal of which is connected to ground. The electron tube 82 also has a cathode 88 coupled through a capacitor 90 to a voltage detector network 92 having a storage capacitor 94 across which is connected a leakage resistor 96, and the passage of current to which is controlled by unidirectional current valves such as diodes 98 and 100 respectively. The voltage stored on capacitor 94 will appear through a line 102 at a control grid 104 of a polar relay switching electron tube 106 in the mark amplitude detecting circuit 28. The electron tube 106 has a cathode 108 coupled through a biasing potentiometer 110 to the positive terminal of a power source such as a battery 112, the negative terminal of which is connected to ground. The polar relay switching electron tube 106 has an anode 111 connected through an electric power line 113 to one side 119 of a solenoid 115 in a polar switching relay 117 in the channel selector and switching circuit 36 which will be hereinafter described.

The secondary 72 of the transformer 70 is also connected through a resistor 114 to a control grid 116 of a signal amplitude limiter tube 118 in the limiter and mark signal detecting circuit 30. The signal amplitude limiter electron tube 118 has an anode 120 coupled through a capacitor 122 and a unidirectional current valve such as a diode 124 to a control grid 126 of a keying relay switching electron tube 128. Also connected in parallel with the diode 124 is a high impedance inductive winding 130 in series with a parallel connected grid biasing capacitor 132 and leakage resistor 134 with the junction between the inductive winding 130, resistor 134 and capacitor 132 grounded. The capacitor 132 in the limiter and mark signal detecting circuit 30 has a much smaller value than the capacitor 94 in the mark amplitude detecting circuit 28. The storage capacitor 94 together with the resistor 96 provide a time response characteristic to voltage signal changes in the mark amplitude detecting circuit 28 much slower than the response characteristic of the capacitor 132 and the resistor 134 combination in the limiter and mark signal detecting circuit 30 to provide different operating functions which will be hereinafter described. The relay switching electron tube 128 has a cathode 136 connected to a variable voltage source as a potentiometer resistor 138 across a power source as a battery 140.

The relay switching electron tube 128 also has an anode 142 normally connected through a moveable switching arm 144 of a relay 146 to one side 148 of a solenoid 150 in a teletypewriter operating relay 152 in the keying relay 38. The moveable switching arm 144 in the relay 146 is normally in circuit with the anode 142 of the teletypewriter relay switching tube 128. The moveable switching arm 144 is connected to an armature 154 which when energized causes the moveable switching arm 144 to break the circuit to the anode 142 and connect the end 148 of the solenoid 150 in the teletypewriter operating polar relay 152 through a reference circuit formed by a potentiometer resistor 156 to ground.

The space frequency amplitude detecting circuit 32 is structurally similar to the mark amplitude detecting circuit 28 just described and is similarly fed from the space filter 26 by a transformer 158 similar to the transformer 70 in the mark frequency channel 20. The transformer has a secondary 160 coupled through a resistor 162 and capacitor 164 to a control grid 166 of an electron tube 168 similar to the tube 82 in the mark amplitude detecting circuit 28. The electron tube 168 has a cathode 170 similarly feeding a voltage detector network 172 similar to the voltage detector network 92 and having a grid biasing storage capacitor 174 and leakage resistor 176 similar to capacitor 94 and resistor 96 in the mark amplitude detector circuit 28. The voltage detector network 172 is connected to a control grid 178 of a polar relay switching electron tube 180, similar to the electron tube 106. The polar relay switching electron tube 180 has a cathode 182 coupled to a variable voltage source such as a potentiometer resistor 184 across a power source as a battery 186. The polar relay switching electron tube 180 has an anode 188 connected to the other side 190 of the solenoid 115 in the polar switching relay 117 of the channel selector and switching circuit 36.

The transformer secondary 160 is also coupled through a resistor 192 to a control grid 194 in a signal amplitude limiter electron tube 196 in the limiter and space signal detecting circuit 34 having a similar construction to the limiter and mark signal detecting circuit 30. The electron tube 196 operates as a signal amplitude limiter in similar manner to that of the electron tube 118 and having its output fed from an anode 198 through a capacitor 200 and unidirectional current valve as a diode 202, to a control grid 204 of a relay switching electron tube 206 similar to the relay switching electron tube 128 in the mark signal detecting circuit 30. A high impedance inductive winding 208 in series with a parallel connected resistor 210 and grid biasing capacitor 212 are connected across the diode 202 in similar manner to that across diode 124.

The relay switching tube 206 has a cathode 214 connected to a variable potential source such as a potentiometer resistor 216 across a power source as a battery 218. The relay switching tube 206 also has an anode 220 normally connected through a moveable switching arm 222 to the other end 224 of the solenoid 150 in the teletypewriter operating polar switching relay 152. The switching arm 222 is connected to an armature 226 in a relay 228 similar to the relay 146. When the relay 228 is energized as will be hereinafter described, the switching arm 222 breaks the circuit to the anode 220 and makes circuit between the end 224 of the solenoid 150 through a potentiometer resistor 230 to ground.

The solenoid 115 of the polar switching relay 117 is coupled at its center to the positive terminal of a power source such as a battery 232, and the negative terminal of which is connected to ground. The polar switching relay 117 has an armature 234 connected to operate a moveable switching arm 236 normally in a neutral position as shown in FIG. 2. When the switching arm 236 is moved upwardly by the armature 234 it makes circuit between a power source such as a battery 238 and a solenoid 240 in the relay 146 to thereby energize the relay 146 to cause the moveable switching arm 144 to move downward and make circuit with the potentiometer 156 as described above. When the polar relay 117 is energized to move the switching arm 236 downward the switching arm 236 makes circuit between power source 238 and a solenoid 242 in the relay 228 so as to cause the moveable switching arm 222 to move downward and and make circuit with the potentiometer 230, as described above.

The teletypewriter operating polar relay 152 includes a power source as a battery 244 connected to the center of the solenoid 150. The teletypewriter operating polar relay 152 has an armature 246 connected to a moveable switching arm 248 normally in the open circuit position against an insulated stop 250 shown in FIG. 2. The armature 246 may actuate the switching arm 248 to move upwardly so as to close the circuit with a power source 252 as a battery, a primary 254 in a transformer 256 and a variable resistor 258, back to the other end of the switching arm 248. Such closure energizes secondary 260 in the teletypewriter 40 to cause the teletypewriter 40 to operate in accordance with conventional frequency shift keyed teletypewriter operation.

*Operation of FIG. 2*

In the operation of the frequency shift keyed signal convertor 17, the output beat frequency signals of the receiver and beat frequency oscillator 14, in the present instance 2125 cycles per second for mark information and 2975 cycles per second for space information, are fed through lines 42 and 44 to the input filter 16. These beat frequency signals are fed from the input filter through the transformer 46 to the automatic gain control amplifier 18 where they are suitably amplified by the amplifier tubes 48 and 50 respectively to a level determined by the position of the grid 52 on the variable resistor 54. The amplified beat frequency information signals from the amplifier 18 are fed through a transformer 68 to the mark information signal filter 24 and space information signal filter 26 in the mark information signal channel 20 and space information signal channel 22 respectively.

The mark information signal filter 24 has a sufficient narrow passband to discriminate against space frequency information signals and therefore in the present exemplary instance passes only 2125 cycles per second mark information signals which are then fed through the transformer 70 simultaneously to control grids 80 of the electron tube 82 and control grid 116 of the electron tube 118 in the mark amplitude detecting circuit 28 and the limiter and mark signal detecting circuits 30 respectively. A mark information frequency signal appearing at the grid 80 and the electron tube 82 will cause a rise in potential of the cathode 88 and will be detected by the diodes 98 and 100 in the detector network 92. The average value of this voltage is stored in the storage capacitor 94 for biasing the grid 104 of the relay switching electron tube 106. The charge on the storage capacitor 94 determines the bias on 104 and thereby the amount of current flowing from the battery 232 through the end 119 of the solenoid 115 of the polar relay 117 and through the line 113 to the electron tube 106.

In similar manner space information frequency signals will appear through the filter 26 and transformer 158 at the control grid 166 to cause the detector network 172 to charge capacitor 174 to an average value of this voltage. The voltage stored on the storage capacitor 174 will determine the bias on the grid 178 in the relay switching electron tube 180 to thereby determine intensity of current flowing from the battery 232 through the lower half of the solenoid 115 to the anode 188 in the electron tube 180.

If there are no interfering signals appearing in either the mark amplitude detecting circuit 28 or the space amplitude detecting circuit 32 or if the interfering signals are small, current flow through the lower and upper halves of the solenoid 115 in the polar relay 117 of the channel selector 36 will be sufficiently balanced to prevent movement of the armature 234 and thereby the moveable switching arm 236. The arm 236 will thus remain in the neutral open circuit position shown in FIG. 2. To obtain this initial operational balance, the potentiometers 110 and 184 in the relay switching circuits of the electron tubes 106 and 180 are suitably adjusted.

In such instance of balanced operation, the teletypewriter 40 is operated directly from the limiter and mark signal detecting circuit 30 and the limiter and space signal detecting circuit 34 as will hereinafter be further described. In such instance, if a mark signal appears through the mark filter 24 and the transformer 70 at the grid 116 of the limiter tube 118 the output of the tube 118 will be of uniform amplitude and will be detected by the detector diode 124 which with the capacitor 132 causes a positive pulse to appear at control grid 126 of the relay switching electron tube 128. The capacitor 132 being much smaller value than the capacitor 94, the pulse on the control grid 126 will cause a momentary flow of current from the battery 244 through the upper half of the solenoid 150, the switching arm 144 and the electron tube 128 to thereby cause the armature 246 to move the moveable switching arm 248 upward to close the circuit formed by the battery 252, solenoid 254, variable resistor 258, and the switching arm 248. This will thereby cause the mark information signal to be registered on the teletypewriter 40 in conventional manner.

If a space information frequency signal appears at the transformer 68 it will be channeled through the space information frequency filter 26 and the transformer 158 at the control grid 194 of the limiter tube 196 to provide a uniform amplitude signal which is detected by the detector diode 202 which, together with the capacitor 212, appears as a positive pulse at the control grid 204, of the electron tube 206. This will cause a current to flow from the battery 244 through the lower half of the solenoid 150, the moveable switching arm 222, the electron tube 206 and the variable resistor 216 to ground to thereby cause the switching arm 248 in the teletypewriter operating relay 152 to be held tightly against the insulated stop 250 and thereby remain an open circuit to the teletypewriter 40. Such open circuit with respect to battery 252 in the solenoid 254 and variable resistor 258 is indicative of space information to the teletypewriter 40.

In the event the mark information signal channel 20 has a high degree of noise along with the mark information signal, the charge on the capacitor 94 will increase to produce a higher positive bias on the control grid 104 than that produced by the storage capacitor 174 on the control grid 178 in the space amplitude detecting circuit 32 in the space information channel 22 which is relatively free of interference signals. In such case, a greater amount of current will flow from the battery 232 through the upper half of the solenoid 115 than through the lower half of the solenoid 115. Thereby, the armature 234 will move the switching arm 236 upwardly to create a closed circuit for current flow from battery 238 through the moveable switching arm 236 and the solenoid 240 to ground. Thereby, the switching arm 144 will be pulled downward to create an open circuit to anode 142 of the electron tube 128 and a closed circuit with the variable resistor 156. Current will then flow from the battery 244, through the upper half of the solenoid 150, the moveable switching arm 144, the variable resistor 156 to ground. This current flow energizes the armature 246 to act as a spring load on the moveable switching arm tending to push it upwardly to close the circuit to the battery 252. However, if a space information frequency signal at this instant appears at the control grid 204 of the electron tube 206 in the limiter and space signal detecting circuit 34, a counteracting current will thereby be caused to flow from the battery 244 through the lower half of the solenoid 150, the moveable switching arm 222, the electron tube 206 and the variable resistor to ground. In such instance, the variable resistor 216 is so set that it will balance the current flow through the upper half of the solenoid 150 as just described to prevent the upward movement of the moveable switching arm 248. Thus, the moveable switching arm 248 will remain stationary, thereby registering the occurrence of a space information signal to the teletypewriter 40.

In the event, in place of the space information signal, a mark information signal occurs, the mark information frequency could not pass through the filter 26 and thereby there would be no comparable bias at the control grid 204 of the electron tube 206 and no comparable equalizing current flow through the lower half of the solenoid 150. Thus, the moveable switching arm 248 would be allowed to move upward to close the circuit between the battery 252, solenoid 254, variable resistor 258 and the moveable switching arm 248, so as to convey the mark frequency information signal to the teletypewriter 40 even though the mark information signal in channel 20 was rendered unintelligible because of interfering noise.

If, on the other hand, a high degree of interference exists in the space information signal channel 22, it will cause a rise in the stored potential on the storage capacitor 174 and thereby at the control grid 178 of the electron tube 180, in the space signal amplitude detecting circuit 32. This will cause an increase in the current flow through the bottom half of the solenoid 115 to thereby energize the armature 234 in the channel selector 36 to pull the moveable switching arm 236 downwardly to close the circuit to and cause current flow from the battery 238 through the moveable switching arm 236 and the solenoid 242 of the relay 228 to ground. This current flow will energize the armature 226 to pull the moveable switching arm 222 downwardly to open the circuit to the anode 220 of the electron tube 206 and close the circuit to the variable resistor 230. Thereby current flows from the battery 244 in the teletypewriter operating relay 152, the lower half of the solenoid 150, the moveable switching arm 222, the variable resistor 230 to ground. This current flow through the lower half of the solenoid 150 will energize the armature 246 to act as a spring load on the moveable switching arm 248 of the teletypewriter operating relay 152 to retain the moveable switching arm 248 downwardly on insulated stop 250. Such downward retention appears as space information to the teletypewriter 40.

In the event a mark frequency signal appears through the mark filter 24 and has a positive pulse at the control grid 126, as explained above, it will cause a current flow from the battery 244 through the upper half of the solenoid 150, the relay switching arm 144, the electron tube 128, the variable resistor 138 to ground. The variable resistor 230 is so arranged that this mark information current through the upper half of the solenoid 150 will be sufficient to overcome the downward pull of the current in the lower half of the solenoid 150 and thereby cause the movable switching arm 148 to close the circuit between the battery 252, the solenoid 254, and variable resistor 258 to convey the mark information pulse to the teletypewriter 40. Since space information signals are rejected and cannot pass through the mark filter 24, the moveable switching arm 248, will be pulled upwardly as just explained to close the circuit to the battery 252 only when mark information signals appear in the limiter and mark frequency signal detecting circuit 30.

Thus, it is seen that the present invention, operating as described, conveys the mark and space information to the teletypewriter even though interfering signals may make the mark information signals in channel 20 unintelligible and even though interfering signals may make the space information signals in channel 22 unintelligible as well as when no interfering signals occur to make the information signals in either of the channels 20 or 22 unintelligible.

This invention is not limited to the specific details in construction and operation described as equivalents will suggest themselves to those skilled in the art.

What is claimed is:

1. In a system having one frequency for space information signals and another frequency for mark information signals, the combination of a pair of channels for the information signals, one of said channels for selectively receiving space frequency information signals, the other of said channels for selectively receiving mark frequency information signals, each of said channels including an amplitude detector means and a signal detector means, comparing means coupled to said amplitude detector means for identifying the amplitude detector means having the smaller amplitude level, means responsive to said identifying means for selecting said smaller interference signal channel, and means in responsive relation to said selecting means for passing signals of the selected channel.

2. In a teletypewriter system having one frequency for space information signals and another frequency for mark information signals, the combination of a pair of channels for the information signals, one of said channels for selectively receiving space frequency information signals, the other of said channels for selectively receiving mark frequency information signals, each of said channels including an amplitude detector means and a signal detector means, a teletypewriter operating relay, a switching means coupling each of the signal detecting means to the operating relay for passing the signals of the respective signal detector means to the operating relay, and a channel selector switch coupled to both of said amplitude detecting means for controlling said switching means.

3. In a teletypewriter system having one frequency for space information signals and another frequency for mark information signals, the combination of a pair of channels for the information signals, one of said channels for selectively receiving space frequency information signals, the other of said channels for selectively receiving mark frequency information signals, each of said channels including an amplitude detector circuit and a signal detector circuit, the amplitude detector circuit having a substantially longer time response to signal amplitude changes than the signal detector circuit, circuit means coupled to the signal detector circuit for operating said teletypewriter in accordance with said mark and space signals, and switching means coupled in responsive relation to said amplitude detector circuits for selectively making and breaking the coupling between said circuit means and one and the other of said signal detector circuits.

4. In a teletypewriter system having one frequency for space information signals and another frequency for mark information signals, the combination of a pair of channels for the information signals, one of said channels for selectively receiving space frequency information signals, the other of said channels for selectively receiving mark frequency information signals, each of said channels including an amplitude detector circuit and a signal detector circuit, the amplitude detector circuit having a substantially longer time response to signal amplitude changes than the signal detector circuit, switch means coupled to said signal detector circuits for operating said teletypewriter, relay means arranged for selectively decoupling one and the other of said signal detector circuits from said switch means, and control means in responsive relation to said amplitude detector circuits and in control relation to said relay means for making said selective decoupling.

5. In a teletypewriter system having one frequency for space information signals and another frequency for mark information signals, the combination of a pair of channels for the information signals, one of said channels for selectively receiving space frequency information signals, the other of said channels for selectively receiving mark frequency information signals, each of said channels including an amplitude detector circuit and a signal detector circuit, the amplitude detector circuit having a substantially longer time response to signal amplitude changes than the signal detector circuit, switch means for operating said teletypewriter, a coupling circuit making electrical engagement between said switch means and mark signal detector circuit, a coupling circuit making electrical engagement between said switch means and space signal detecting circuit, a relay in each of said coupling circuits for breaking the electrical engagement, and control means coupled in responsive relation to said amplitude detector circuits and in control relation to the relays for selectively operating said relays in response to signal changes in said amplitude detector circuits.

6. In a frequency shift keyed information signal converter of the type having one channel for selectively receiving mark information signals and another channel for selectively receiving space information signals, the combination of amplitude level sensing means in each channel for continuously sensing signal amplitude level in the respective channel, a power circuit, means for controlling output of said power circuit coupled in responsive relation to said information signal channels, and means coupled in responsive relation to said amplitude level sensing means for controlling the coupling relation between said power circuit control means and information signal channels.

7. In a converter for frequency shift keyed signal information of the type having one channel for isolating mark frequency signals and another channel for isolating space frequency signals, the combination of a signal information output circuit in each channel, means in each channel for continuously sensing signal amplitude level in the respective channel, a relay means having a solenoid with two ends and a center portion, the output circuit of the mark channel coupled to one end of the solenoid, the output circuit of the space channel coupled to the other end of the solenoid, a power source coupled to the center portion of the solenoid, a reference circuit corresponding to each of the output circuits, selector switch means in the output and reference circuits of said mark and space channels, and control means in responsive relation to said sensing means for causing said switch means to selectively couple the solenoid to the output circuit and the corresponding reference circuit in response to signal amplitude level in the sensing means.

8. In an electric information signal converting system having one electric signal frequency for space information signals and another electric signal frequency for mark information signals, the combination of a pair of electric channels for the information signals, filter means in one of said channels for isolating mark frequency signals, filter means in the other of said channels for isolating space frequency signals, a signal amplitude limiter means in each of said channels, said limiter means having an input and an output circuit, the input circuit being coupled to the corresponding filter means, signal detector means in each of said channels coupled to the corresponding limiter output circuit, a signal amplitude detector means in each of said channels coupled to the respective filter means, electric signal amplitude comparing means coupled to the amplitude detector means in each channel, means in responsive relation to the comparing means for selecting one of the channels in accordance with a preset comparison condition, and means in responsive relation to the selecting means for relaying signals from the limiter means of the selected channel.

9. A frequency shift keyed signal receiving system for space information signals of one frequency and mark information signals of another frequency, said system comprising a filter having a narrow band-pass including the space and mark signal frequencies, an automatic gain control amplifier coupled to said filter for amplifying the filtered signals, a pair of channels coupled to said amplified, a filter having a narrow band-pass centered on the mark frequency signals in one of the channels, a filter having a narrow band-pass centered on the space frequency signals in the other channel, a signal amplitude limiter and detector circuit and a signal amplitude detecting circuit in each of said channels coupled to the filter in the channel, electric signal amplitude comparing means coupled to the amplitude detecting means in each channel, means in responsive relation to the comparing means for selecting the channel having the smaller signal amplitude, and means in responsive relation to the selecting means for relaying the signals of the limiter and detector circuit of the selected channel.

10. In a system having one electric signal frequency for space information signals and another electric signal frequency for mark information signals, the combination of a pair of electric signal channels, means in one channel for isolating space frequency signals, means in the other channel for isolating mark frequency signals, means in each channel for continuously sensing signal amplitude level in the channel, a pair of two-pole switch means, an output circuit for each of said channels coupled to the respective channel and one pole of the respective switch means, a current means corresponding to the channel output circuit current for each channel coupled to the other pole of the respective switch means, comparing means coupled to said amplitude sensing means, relay means, and means responsive to said comparing means for selectively coupling said relay means to one and the other of said poles.

References Cited in the file of this patent

UNITED STATES PATENTS

| | | |
|---|---|---|
| 1,752,325 | Bransen | Apr. 1, 1930 |
| 2,118,917 | Finch | May 31, 1938 |
| 2,211,750 | Humby | Aug. 20, 1940 |
| 2,293,501 | Hansell | Aug. 18, 1942 |
| 2,397,884 | Rhodes | Apr. 2, 1946 |
| 2,494,309 | Peterson et al. | Jan. 10, 1950 |
| 2,513,525 | Shenk | July 4, 1950 |
| 2,555,557 | Peterson et al | June 5, 1951 |